United States Patent [19]

Burkes et al.

[11] Patent Number: 5,531,824

[45] Date of Patent: Jul. 2, 1996

[54] METHOD OF INCREASING DENSITY AND STRENGTH OF HIGHLY SILICEOUS CEMENT-BASED MATERIALS

[76] Inventors: J. Pate Burkes, 349 Funches Rd; Philip G. Malone, 107 Fox Run La.; Lillian D. Wakeley, 104 Quail Run, all of Vicksburg, Miss. 39180

[21] Appl. No.: 451,082

[22] Filed: May 25, 1995

[51] Int. Cl.$^6$ .................... C04B 14/04; C04B 14/06
[52] U.S. Cl. .................... 106/737; 106/705; 106/706; 106/714; 106/718; 106/789; 106/811; 106/812; 106/819; 106/738; 106/DIG. 1; 264/340; 427/421; 427/427; 427/430.1; 427/443.2; 427/444
[58] Field of Search .................... 106/12, 737, 714, 106/705, 718, 789, 811, 819, 713, 812, 287.17, 286.8, DIG. 1, 706, 738; 427/421, 427, 430.1, 443.2, 444; 264/340, DIG. 49

[56] References Cited

U.S. PATENT DOCUMENTS

| 3,047,407 | 7/1962 | Ehrenburg | 106/12 |
|---|---|---|---|
| 3,885,979 | 5/1975 | Rio et al. | 106/737 |
| 4,234,347 | 11/1980 | Kirilishin | 106/737 |
| 4,306,912 | 12/1981 | Fross | 106/714 |
| 4,842,649 | 6/1989 | Heitzmann et al. | 106/DIG. 1 |
| 5,071,579 | 12/1991 | Joshston et al. | 106/14.12 |
| 5,076,851 | 12/1991 | Skovara et al. | 106/714 |
| 5,314,755 | 5/1994 | Malric et al. | 106/713 |
| 5,352,288 | 10/1994 | Mallow | 106/737 |
| 5,374,308 | 12/1994 | Kirkpatrick et al. | 106/705 |

*Primary Examiner*—Mark L. Bell
*Assistant Examiner*—Michael Marcheschi

[57] ABSTRACT

High-strength, high-hardness concrete, mortar, or grout is prepared by blending portland cement, water, and aggregate with a source of reactive silica, pouring the concrete mixture into a form, allowing the concrete to cure until it reaches its conventional 28-day strength, and immersing the cured concrete in a solution of alkali metal hydroxide and aluminum nitrate at 60°–110° C. for 3–14 days. Alternatively, the cured concrete may be sprayed with the solution and maintained at 60°–110° C. for 3–14 days. A dense, hard surface layer of alkali metal aluminum silicate is formed, the compressive strength and surface hardness of the concrete is increased, and the water infiltration rate into the concrete is decreased.

4 Claims, No Drawings

METHOD OF INCREASING DENSITY AND STRENGTH OF HIGHLY SILICEOUS CEMENT-BASED MATERIALS

GOVERNMENT INTEREST STATEMENT

The invention described herein may be manufactured, licensed, and used by or for governmental purposes without the payment of any royalties thereon.

I. BACKGROUND OF THE INVENTION

1. Field of Invention

This invention relates to a method of increasing the strength and hardness of concrete, and decreasing its permeability to water. More specifically, it relates to methods of preparing a dense, hard surface on concrete, mortar, and grout which is stronger, harder, and more impervious to water than the original cemented material.

2. Prior Art

Current practice for making strong, impervious surfaces on concrete calls for the use of liners, coatings, or impregnation. Organic polymers such as latexes, epoxies, and acrylates are typically used to improve the strength and imperviousness of concrete. Polymers typically do not change the chemistry of the concrete but fill the pore spaces in the concrete and cover the surface to make the concrete less permeable to liquids. Polymer coatings do not increase the hardness and compressive strength of the concrete. Polymer impregnation can be used to improve the strength and hardness of concrete, but it involves the use of solvents, which cause air pollution.

Concrete may be treated in a vacuum chamber with silicon tetrafluoride gas, whereby calcium fluoride and silicon hydroxide are formed (L. H. Tuthill, "Resistance to Chemical Attack," ASTM Special Technical Publication No. 169, pp. 188–200, 1956.) This process has an adverse environmental impact and represents a health hazard because of the toxicity of silicon tetrafluoride. moreover, unwanted fluorides leach out of the concrete after treatment.

It is known that aqueous sodium metasilicate may be applied to the surface of the concrete to form a gel that fills the pores of the concrete. When the sodium leaches out, there may be a deleterious expansion when the alkaline solution reacts with opaline silicate aggregate in the concrete. Furthermore, because of the viscosity of aqueous sodium metasilicate solutions, penetration into the surface of the concrete is not deep.

Aqueous sodium silicate and silicofluoride solutions may be applied to the surface of concrete to form a low-permeability surface as the silicate reacts with the free lime in the concrete. This method is only effective with concrete whose surface is porous (Construction Repair, Palladin Publications, March/April 1994).

It is also known that the compressive strength of portland cement concrete may be increased by incorporating up to about 10% of reactive, amorphous silica in the concrete mixture which reacts with calcium hydroxide produced by the hydration of portland cement. The reaction of the calcium hydroxide and silica produces additional calcium silicate hydrate gel that bonds the aggregate particles in the concrete together.

U.S. Pat. No. 4,997,484 discloses a process in which fly ash, an alkali activator such as sodium hydroxide, and citric acid are incorporated to produce a cement that achieves high strength in a short curing time.

U.S. Pat. No. 4,306,912 discloses a process in which a short hardening time and early attainmnent of high strength are achieved by addition to the cement mixture of a sulfonated polyelectrolyte and sodium carbonate and/or sodium hydroxide.

U.S. Pat. No. 4,509,985 describes a process whereby early high strength is achieved by adding ground blast furnace slag to a mixture of aluminosilicate oxide, an alkali metal hydroxide, and an alkali metal polysilicate.

U.S. Pat. No. 3,047,407 discloses a method of waterproofing cement and concrete by preparing a mixture of a fatty soap, saponifiable resin soap, sodium hydroxide, and glycerin, stirring into this mixture a second mixture of aluminum chloride and potassium hydroxide, and combining this mixture with a third mixture of potassium hydroxide, caustic lime, and calcium chloride.

U.S. Pat. No. 4,234,347 discloses a binder for chemically resistant concrete comprising finely divided quartz having a specific surface area of 1000–5000 $cm^2$/gram and a cystalline modification of silica having alkali metal oxides on its surface. This binder is produced by mixing quartz sand with alkali metal carbonate and hydroxide and heating it to 1000°–1550° C.

U.S. Pat. Nos. 5,060,445 and 5,283,998 describe a roofing tile having an upper surface coated with an acrylic or asphaltic adhesive mixed with a fire-resistant material such as sodium carbonate or ammonium phosphate and lightweight concrete particles with decorative and heat-resistant particles covered by sodium silicate.

II. SUMMARY OF THE INVENTION

There is a need, therefore, for an improved process whereby the hardness and compressive strength of concrete and other cement-based products such as mortar or grout are increased and the permeability to liquids is decreased. It has now been discovered that these objectives can be achieved by allowing a hard, impervious, alkali metal aluminum silicate layer to form in the pores of specially formulated concrete. A source of reactive silica, such as fly ash, finely-ground blast furnace slag, metakaolin, or other glassy silicates, is provided in the concrete and later made to react with concentrated sodium or potassium hydroxide and a source of aluminum at elevated temperature. The alkali metal aluminum silicates thus formed include zeolites and zeolite-related silicates such as cancrinite and sodalite. This dissolution/recrystallization process fills the pores of the concrete and forms a hard, impervious surface layer in the presence of the hydrated cement and aggregate, which increases the compressive strength of the concrete.

III. DETAILED DESCRIPTION OF THE INVENTION

Freshly-mixed portland cement concrete, grout, or mortar, in accordance with this invention, is mixed with a source of reactive silica to produce a new mixture containing 10–46 weight percent of reactive silica. Sources of reactive silica include finely-ground glassy, amorphous silicate, fly ash, finely-ground blast furnace slag, metakaolin, silica fume or combinations thereof. Crystalline silicates such as quartz, feldspar and kaolin are not reactive. This concrete mixture is poured into a form and allowed to cure for 28 days. Cure times less than 28 days may be used if a rapid curing technique such as steaming or autoclaving is used which allows the concrete to reach its conventional, moist-cured, 28-day strength in less time.

The concrete is then immersed in a strongly alkaline solution containing 3–6 molar (gram-moles/liter) sodium or potassium hydroxide or combinations thereof, preferably 4–5 molar; and 0.2–0.8 molar aluminum nitrate, $Al(NO_3)_3$, preferably about 0.6 molar. Other sources of aluminum, such as aluminum sulfate or chloride, are unsuitable. The addition of aluminum nitrate may be omitted if the source of reactive silica in the cement mixture contains sufficient alumina. The concrete is maintained in this solution for 3–14 days, preferably about 5 days, at 60°–110° C., preferably about 80°–100° C. The solution may be drained from time to time, e.g. every other day, and replaced with fresh solution to maintain alkalinity.

Alternatively, the cured portland cement concrete is sprayed with a solution containing 3–6 molar NaOH or KOH, preferably 4–5 molar; and 0.2–0.8 molar aluminum nitrate, preferably about 0.6 molar; and maintained in an oven at 60°–100° C., preferably at about 80°–100° C., for 3–14 days, preferably about 5 days, in an atmosphere maintained saturated with water vapor by the injection of steam. Instead of an oven, an insulated box with steam injection may be used to maintain a temperature near 100° C. and a high relative humidity. Again, the addition of aluminum nitrate to the solution may be omitted if the source of reactive silica in the concrete mixture contains sufficient alumina.

During the alkaline treatment of the concrete, the alkali hydroxide dissolves the reactive glassy silicate and causes it to reprecipitate as crystalline alkali aluminum silicate, or zeolite, cancrinite, or sodalite in the pores of the concrete, forming a dense, high-strength surface layer that is impervious to liquids. It is important that the alkaline treatment be undertaken after the 28-day strength has been reached; treating the concrete earlier alters the cement hydration process that is needed to impart strength to the concrete.

At the end of the alkaline treatment, the concrete is allowed to cool to room temperature over a 12-hour period, and it is flushed with water or 10% phosphoric acid to remove unreacted sodium or potassium hydroxide and aluminum nitrate, and to prevent the formation of efflorescence from carbonate salts. It is found that a hard, dense layer of about 2 to 6 mm thickness has formed at the surface of the concrete. Hardness, as measured with a Rockwell-style steel ball indenter in accordance with a modification of ASTM D 785-65, is about 40% higher than for untreated concrete. The unconfined compressive strength of 25 mm cubes, determined in accordance with ASTM C 109-92, is about three times as high as for untreated concrete, and the water infiltration rate under an initial hydraulic head of about 10 cm of water is one-fifth to one-thousandth of the water infiltration rate for untreated mortar.

End uses for concrete, mortar, or grout treated by the method of this invention include chemical-resistant floor tile, concrete-lined pipes, and concrete slabs for lining pits for hazardous waste disposal.

While this invention has been described in terms of a specific preferred embodiment, it is understood that it is capable of further modification and adaptation of the invention following in general the principle of the invention and including such departures from the present disclosure as come within the known or customary practice in the art to which the invention pertains and as may be applied to the central features set forth, and fall within the scope of the invention and of the limits of the appended claims.

What is claimed is:

1. A method of preparing cement-based products of increased hardness, increased compressive strength, and decreased permeability to liquids comprising the steps of (a) mixing portland cement, water, and aggregate with from 10 to 46 percent by weight reactive silica;

(b) pouring the mixture into a form and allowing it to cure until it attains a 28-day strength and forms a cured product;

(c) immersing the cured product in an aqueous alkali metal hydroxide solution containing 3–6 gram-moles per liter of an alkali metal hydroxide and 0.2–0.8 gram-moles per liter aluminum nitrate at about 60°–110° C. from 3–14 days; and (d) cooling the product to room temperature.

2. A method of preparing cement-based products of increased hardness, increased compressive strength, and decreased permeability to liquids comprising the steps of (a) mixing portland cement, water, and aggregate with from 10 to 46 percent by weight reactive silica;

(b) pouring the mixture into a form and allowing it to cure until it attains a 28-day strength and forms a cured product;

(c) spraying onto a surface of the cured product an aqueous alkali metal hydroxide solution containing 3–6 gram-moles per liter of an alkali metal hydroxide and 0.2–0.8 gram-moles per liter aluminum nitrate at about 60°–100° C. and maintaining this temperature from 3–14 days; and (d) cooling the product to room temperature.

3. The methods of claims 1 or 2 wherein the alkali metal is selected from the group consisting of sodium, potassium, and any combination thereof.

4. The methods of claims 1 or 2 wherein the reactive silica comprises finely-ground, amorphous silicate, fly ash, finely-ground blast furnace slag, metakaolin, silica fume, or any combination thereof.

* * * * *